(12) United States Patent
Stropki, Jr. et al.

(10) Patent No.: US 7,339,134 B2
(45) Date of Patent: Mar. 4, 2008

(54) EXTENSION LIFT TRUCK MODIFICATION

(75) Inventors: John M. Stropki, Jr., Solon, OH (US);
William T. Matthews, Chesterland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 332 days.

(21) Appl. No.: 10/815,536

(22) Filed: Apr. 1, 2004

(65) Prior Publication Data
US 2005/0224478 A1 Oct. 13, 2005

(51) Int. Cl.
*B23K 9/10* (2006.01)
(52) U.S. Cl. .................... 219/130.1; 219/136
(58) Field of Classification Search ........... 219/130.1, 219/136
See application file for complete search history.

(56) References Cited

U.S. PATENT DOCUMENTS

| | | | |
|---|---|---|---|
| 5,250,786 A * | 10/1993 | Kikuchi et al. | 219/130.32 |
| 5,864,116 A * | 1/1999 | Baker | 219/130.33 |
| 5,991,169 A | 11/1999 | Kooken | |
| 6,091,612 A | 7/2000 | Blankenship | |
| 6,982,398 B2 | 1/2006 | Albrecht | |

FOREIGN PATENT DOCUMENTS

| | | | |
|---|---|---|---|
| DE | 26 50 522 | * | 5/1978 |
| GB | 2 316 244 | * | 2/1998 |
| JP | 54 155950 A | | 12/1979 |
| JP | 56-77068 | * | 6/1981 |
| JP | 61 135479 A | | 6/1986 |
| JP | 04 327375 A | | 11/1992 |
| JP | 04 356372 A | | 12/1992 |
| JP | 5-23852 | * | 2/1993 |
| JP | 06 182548 A | | 7/1994 |
| JP | 10 314939 A | | 12/1998 |

OTHER PUBLICATIONS

*Welders Reach for the Sky*, Equipment Today, Oct. 2002, p. 38.

* cited by examiner

*Primary Examiner*—Kevin P. Kerns
(74) *Attorney, Agent, or Firm*—Fay Sharpe LLP

(57) ABSTRACT

An apparatus for welding, including a lift mechanism for lifting a personnel platform attached to an end of the lift mechanism, a drive system for moving the apparatus, where the drive system includes a DC power source, a set of controls mounted on the platform for controlling the drive system and the lift mechanism, and an electric arc welding system for creating a DC welding arc between an electrode and a workpiece, where the welding system is mounted on the personnel platform and powered by the DC power source.

4 Claims, 5 Drawing Sheets

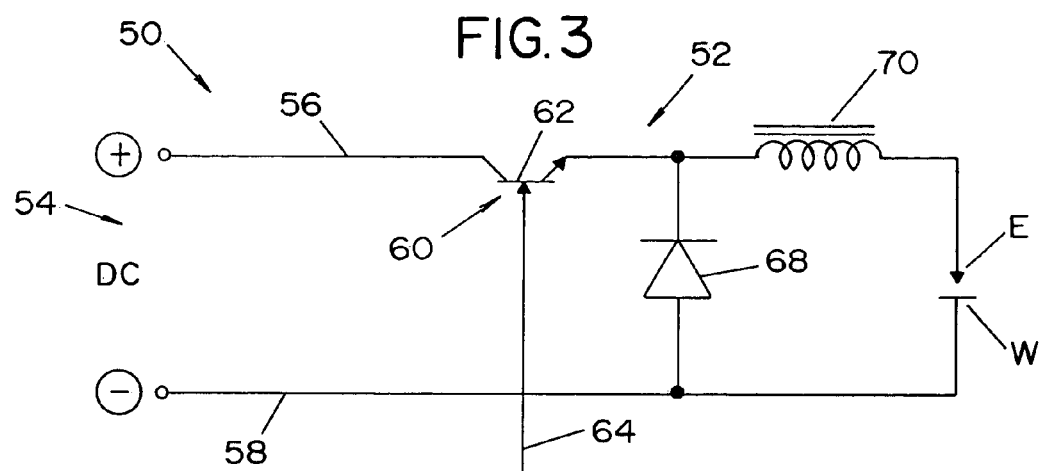
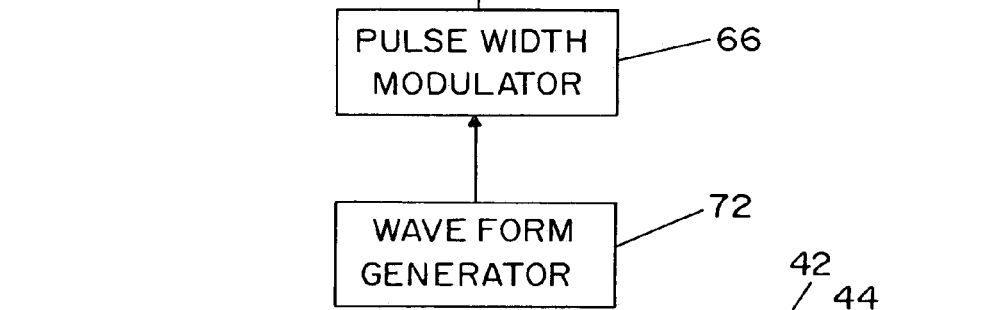
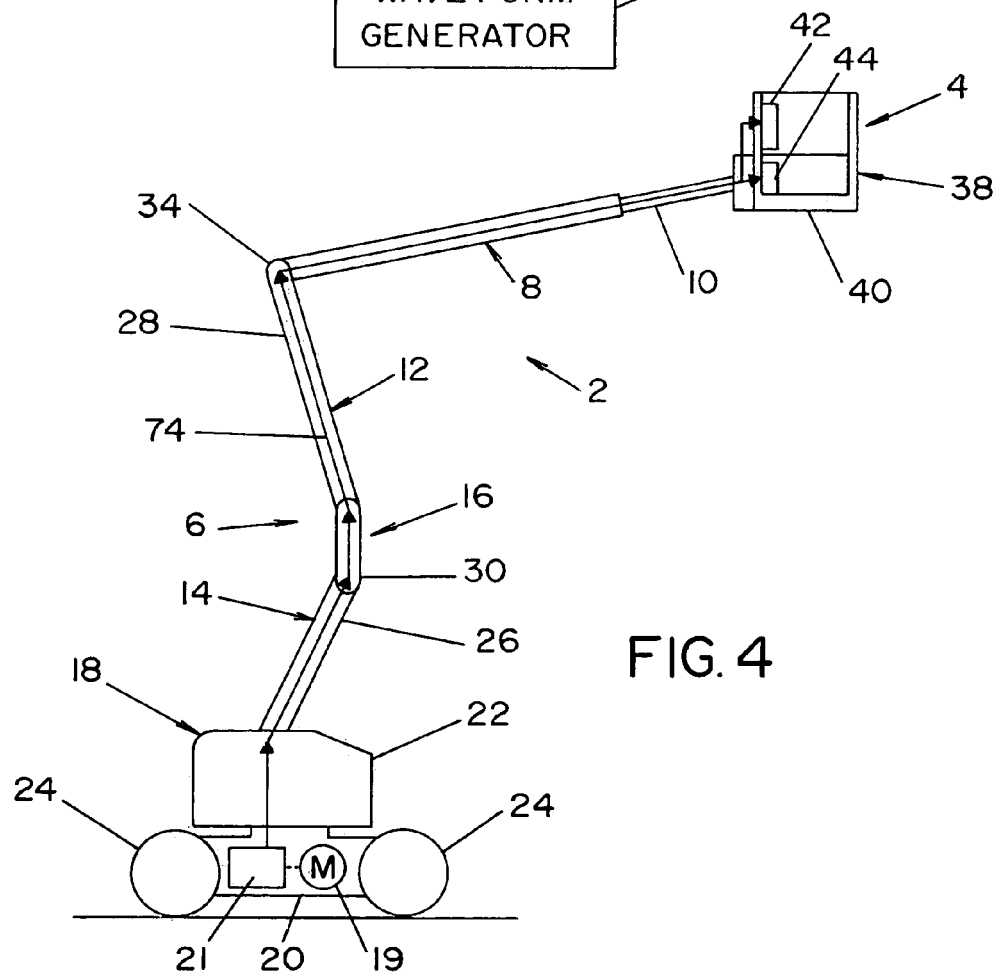

FIG. 5
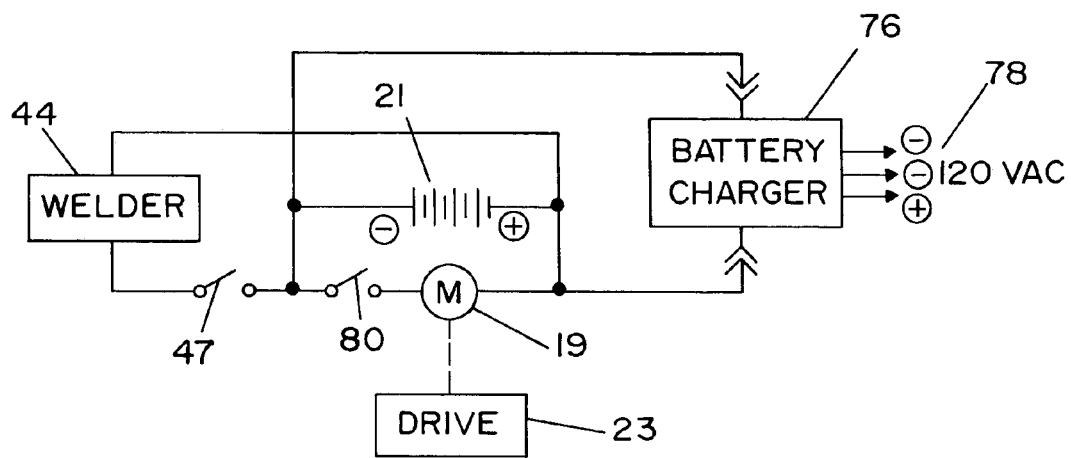
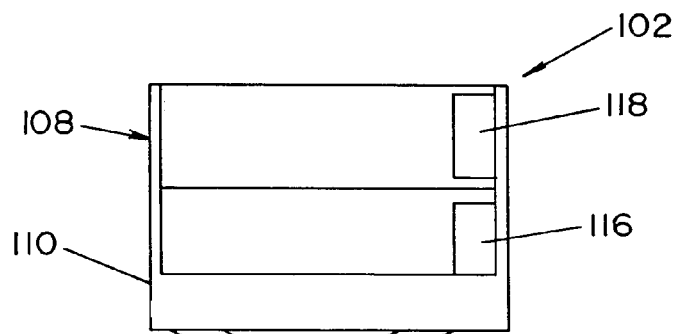
FIG. 6
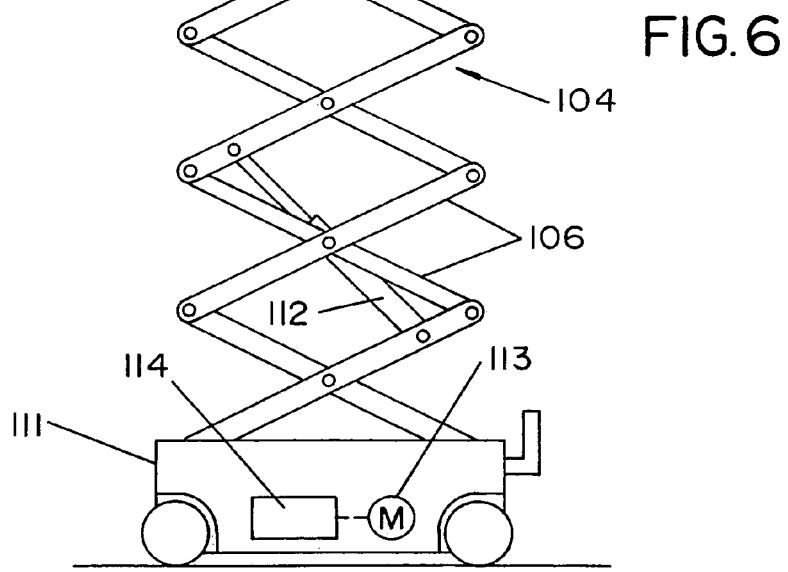

EXTENSION LIFT TRUCK MODIFICATION

The present invention relates generally to the art of welding, and, more particularly, to an extension lift truck modification, wherein an electric arc welding system is incorporated into the personnel platform of a lift truck with a DC power source and is powered by the lift's DC power source.

INCORPORATION BY REFERENCE

The present invention relates to an electric arc welding system employing well known chopper technology. Many patents disclose chopper technology as used in arc welding. One such patent is Baker, U.S. Pat. No. 5,864,116, which is incorporated by reference herein as background information. This patent shows the architecture of a DC down chopper having a circuit for controlling the effective inductance between the down chopper and the welding operation.

BACKGROUND OF THE INVENTION

By way of background, many different types of lifts for positioning workers and material at various heights are presently in use. Lifts are used in many different types of environments, such as telephone line work, construction, fruit picking, general maintenance work on buildings, and the like.

One particularly advantageous type of lift is an articulating boom lift. An articulating boom lift includes an articulating boom formed by a plurality of sections hinged to one another. The sections are supported by a base that usually includes wheels and a drive system for transporting the crane. The boom sections may have a Z-shaped profile when the boom is in a partially extended position. The lower boom sections make up a "raising linkage" and the upper boom section, which may telescope, extends from the raising linkage to a personnel platform that supports the operator of the lift. Such an articulating boom lift is also known as a Z-boom lift, because of the boom's Z-shaped profile when in use.

While such an articulating boom lift can quickly lift workers to the job, power tools such as a welder generally require a separate ground-based power source. Thus, generators and combination generator/welders typically have to be rented or purchased and then brought to the work site along with the lift. Extra costs are thus incurred, and the products are generally exposed to the risk of accidental damage or theft. Further, this means there are cumbersome leads hanging from the boom platforms down to the portable equipment, and, during operation, a welder or generator has to be moved every time the user needs to change position or power level.

Prior art welder/lift systems involved welders with AC input power mounted on the platforms of large, engine-powered boom lifts. In such systems, the boom lift generator is used to deliver single-phase or three-phase power to the welder. However, one drawback to these prior art welder/lift combination systems is that such systems are generally expensive to purchase, run and maintain, and they are relatively complex in nature. Further, many on-site maintenance jobs require the use of only a small, electric boom lift, which would not include an on-board generator.

THE INVENTION

The present invention contemplates a new and improved arc welder/lift system that resolves the above-referenced difficulties and others by incorporating an arc welder with a DC input into a DC-powered lift and using the lift's DC power source to supply power to the welder.

In accordance with one aspect of the present invention, there is provided an apparatus for welding. The welding apparatus comprises a lift mechanism for lifting a personnel platform attached to an end of the lift mechanism, a drive system for moving the apparatus, where the drive system includes a DC power source, a set of controls mounted on the platform for controlling the drive system and the lift mechanism, and an electric arc welding system for creating a welding arc between an electrode and a workpiece, where the welding system is mounted on the personnel platform and powered by the DC power source.

In accordance with another aspect of the present invention, there is provided an apparatus for welding. The apparatus comprises a Z-shaped articulating boom lift operative to lift a personnel platform attached to one end of said boom lift, said personnel platform comprising a cage and a standing base, a drive system operative to move the apparatus, where the drive system comprises a drive motor and a DC power source, a set of controls mounted in the cage operative to control the drive system and the articulating boom lift, and an electric arc welding system operative to create a welding arc between an electrode and a workpiece, where the welding system is mounted in the cage and powered by the DC power source.

In accordance with yet another aspect of the present invention, there is provided an apparatus for welding. The apparatus comprises a scissor lift operative to lift a personnel platform attached to one end of said boom lift, said personnel platform comprising a cage and a standing base, a drive system operative to move said apparatus, where the drive system comprises a drive motor and a DC power source, a set of controls mounted in the cage operative to control the drive system and the scissor lift, and an electric arc welding system operative to create a welding arc between an electrode and a workpiece, where the welding system is mounted in the cage and powered by the DC power source.

In accordance with yet another aspect of the present invention, a mobile welding apparatus is provided. The apparatus comprises: a vehicle having a DC power source, where the vehicle comprises an industrial vehicle or a construction vehicle, and an electric arc welding system mounted on the vehicle for creating a DC welding arc between an electrode and a workpiece, where the welding system is powered by the DC power source.

Various options and features are preferably present in conjunction with the above embodiments. By way of non-limiting example, the welding system may include a power supply that supplies welding current to the electrode, with the power supply including a pulse width modulator that at least partially controls the welding current to the electrode and a waveform generator that at least partially controls the pulse width modulator. The power supply creates a series of current pulses that constitute a welding cycle representative of a current waveform, and the pulse width modulator controls a current pulse width of a plurality of the current pulses. The power supply of the welding system may comprise a DC down chopper that includes a DC input source, where the DC input source is the DC power system of the drive system. The DC power system may comprise a 48 volt battery pack or it may be supplied with recharging power by an on-board battery charger, where the battery charger may be plugged into an external AC power source via an extension cord. Further, the controls may be integrated with the welder to form a single unit.

The primary object of the present invention is the provision of an extension lift truck modification, wherein the modification includes a DC power source that supplies power to both a drive system for the lift and to an arc welder mounted in the personnel platform of the lift.

Yet another object of the present invention is the provision of an extension lift truck modification as defined above, which is inexpensive, efficient in operation, and may be employed in a variety of welding situations.

These and other objects and advantages will become apparent from the following description taken together with the accompanying drawings.

BRIEF DESCRIPTION OF THE DRAWINGS

FIG. 3 is a wiring diagram showing a basic DC down chopper used as a power supply for an arc welding process.

FIG. 4 is a schematic elevational view of the arc welder/boom lift system.

FIG. 5 is a basic wiring diagram showing the DC power source being charged with a battery charger.

FIG. 6 is a schematic elevational view of an arc welder/scissor lift system.

PREFERRED EMBODIMENT

Figure 1:
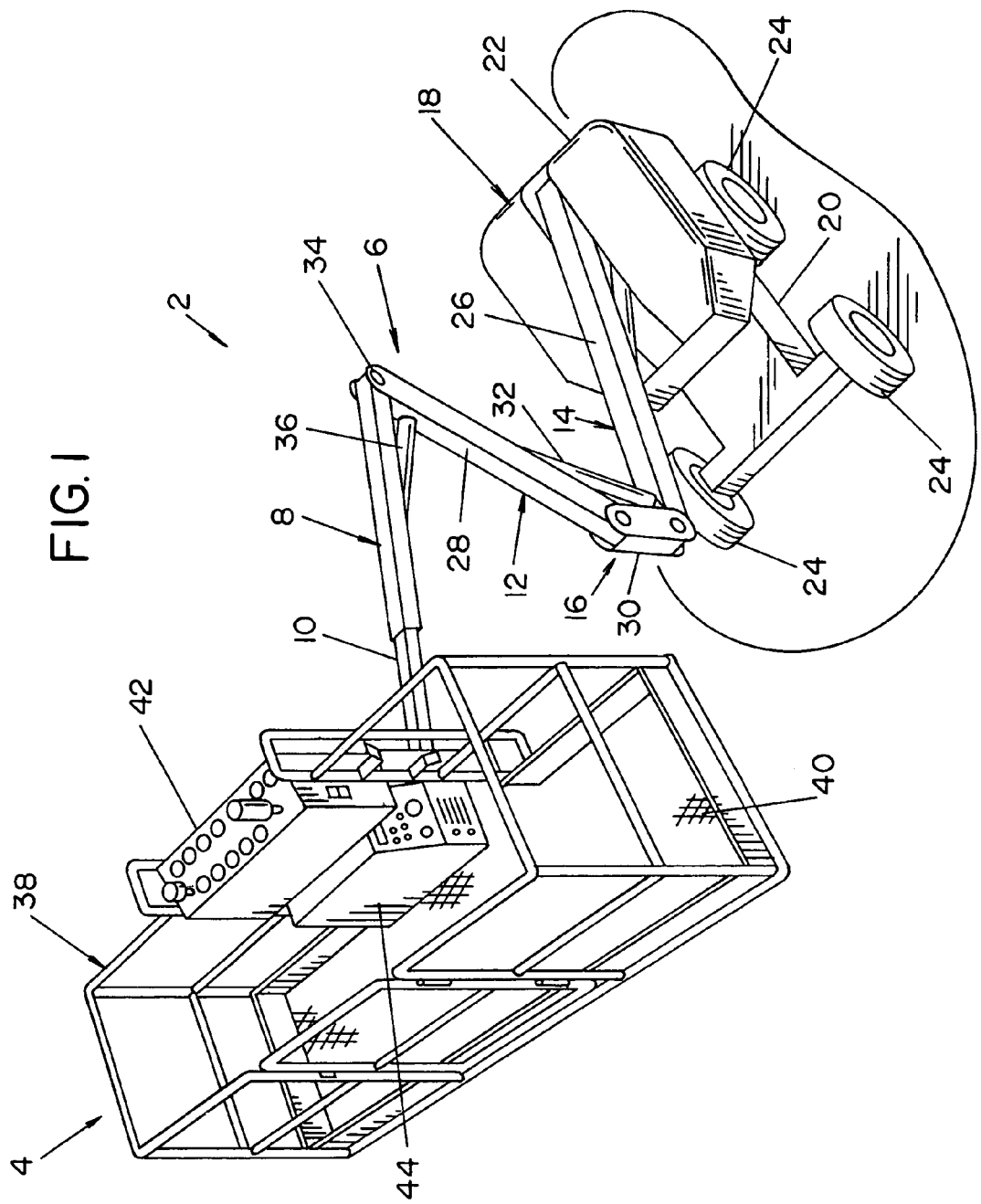
FIG. 1 is a perspective view of an arc welder/boom lift system incorporating aspects of the present invention, with the articulating boom in an extended position.

Referring now to the drawings wherein the showings are for the purpose of illustrating the preferred embodiment and its advantages only and not for the purpose of limiting same, with like numerals being used for like and corresponding parts of the various drawings, FIG. 1 is a perspective view of an arc welder/lift system 2. The arc welder/lift system 2 includes a personnel platform 4 attached to the load-receiving end of a three-section, Z-shaped articulating boom 6. The upper section 8 of the articulating boom 6 is attached to the personnel platform 4 and telescopes 10. The middle and lower sections 12 and 14 define a raising linkage 16. The raising linkage 16 extends from a turntable 18 that is mounted on a drive chassis 20. The turntable 18 and the drive chassis 20 form the base of the arc welder/lift system 2 shown.

Briefly described, the articulating boom 6 is designed such that it can extend upward, as shown in FIG. 1, or can be lowered into a stowed position (not shown). The drive chassis 20 can be operated like a vehicle to move the arc welder/lift system 2 to any desired location on the work site. As is known in the art, the drive speed of the drive chassis 20 is typically reduced when the articulating boom 6 is raised from the stowed position. The turntable 18 is rotatably mounted on the drive chassis 20 so that the upper section 8 can extend in any direction from the drive chassis 20. The turntable 18 typically includes a hardened outer shell 22 in which is mounted hydraulic and other equipment (not shown, but known in the art) needed to operate the articulating boom 6 and other aspects of the arc welder/lift system 2.

As shown in more detail in FIG. 4, a drive motor 19 and a 48 volt DC power source 21 of a drive system 23 (see FIG. 5) is typically mounted below the turntable 18, although the power source 21 may be mounted elsewhere such as in the outer shell 22. The DC power source 21 typically comprises a 48 volt battery pack consisting of eight 6 volt high capacity deep discharge batteries. It is to be appreciated, however, that the DC power source 21 may comprise other known sizes and combinations of batteries. The DC power source 21 or battery pack may be mounted in swing-out boxes (not shown, but known in the art) for easy access to the batteries and battery cables. As shown in FIG. 1, the drive chassis 20 includes four wheels 24, which define the outer edges of the base of the arc welder/lift system 2.

The lower section 14 of the raising linkage 16 includes a lower arm 26, which extends from the turntable 18 to a middle arm 28. The lower arm 26 and the middle arm 28 are connected by a lower pivot assembly 30. The lower pivot assembly 30 is hingedly connected to adjacent ends of the lower arm 26 and the middle arm 28 in a conventional and well known manner. The other end of the lower arm 26 is hingedly connected to the turntable 18, also in a conventional and well known manner.

Typically, a middle lift hydraulic actuator assembly 32 is attached to and extends between the middle arm 28 of the middle section 12 and the lower arm 26 of the lower section 14 of the raising linkage 16. It is to be understood that either or both of the middle and lower sections 12, 14 of the raising linkage 16 could be formed of single, or include additional, arms as is required by the force to be applied to the articulating boom 6 during use.

The raising linkage 16 extends from the turntable 18 to the lower end of an upper pivot assembly 34. More specifically, the upper end of the middle arm 28 is hingedly connected to the upper pivot assembly 34. One end of the upper section 8 of the articulating boom 6 is hingedly connected to the upper end of the upper pivot assembly 34. An upper lift hydraulic actuator assembly 36 extends between the lower end of the upper pivot assembly 34 and the upper section 8 of the articulating boom 6. The personnel platform 4 is attached to the distal, load-receiving end of the upper section 8, which is sometimes called the primary boom section.

The personnel platform 4 may include any number of features needed to meet the requirements of a given application. For example, the personnel platform 4 may have room for one or more workers and one or more toolboxes. Further, the personnel platform 4 may include a 180-degree platform rotation mechanism, which allows the platform to be aligned in any desired direction (not shown), or the platform 4 may include attachments such as a jib boom (not shown), which offers further flexibility of movement of the platform. For ease of illustration, the personnel platform 4 shown in the drawings is a simple construction made to hold two people. The platform 4 typically includes a cage 38 and a standing base 40. Controls 42 are provided in the cage 38 for operating the articulating boom 6 and the drive system 23.

Figure 2:
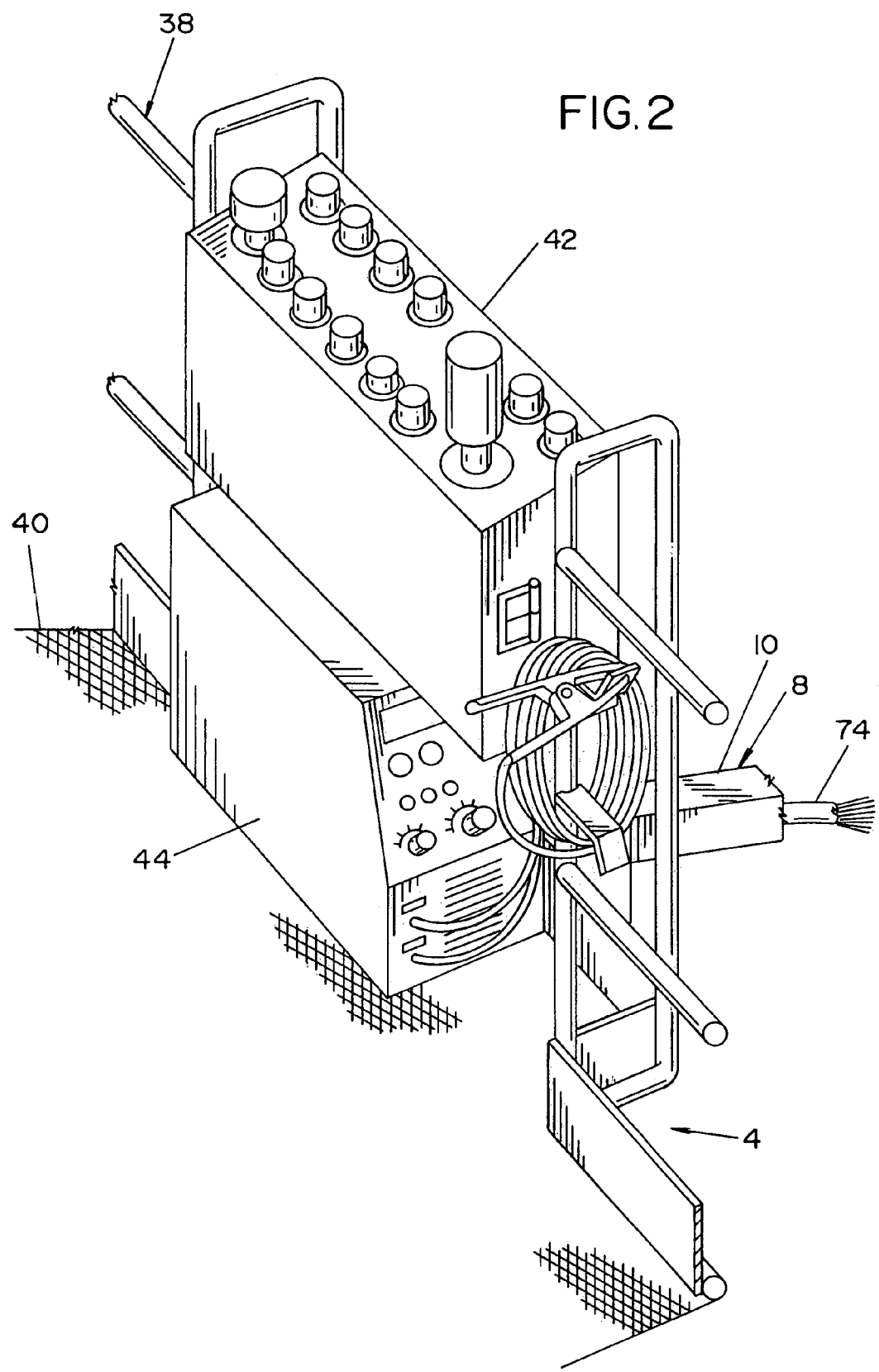
FIG. 2 is an enlarged fragmentary perspective view of the controls and the welder mounted in the cage of the personnel platform.
Figure 2A:
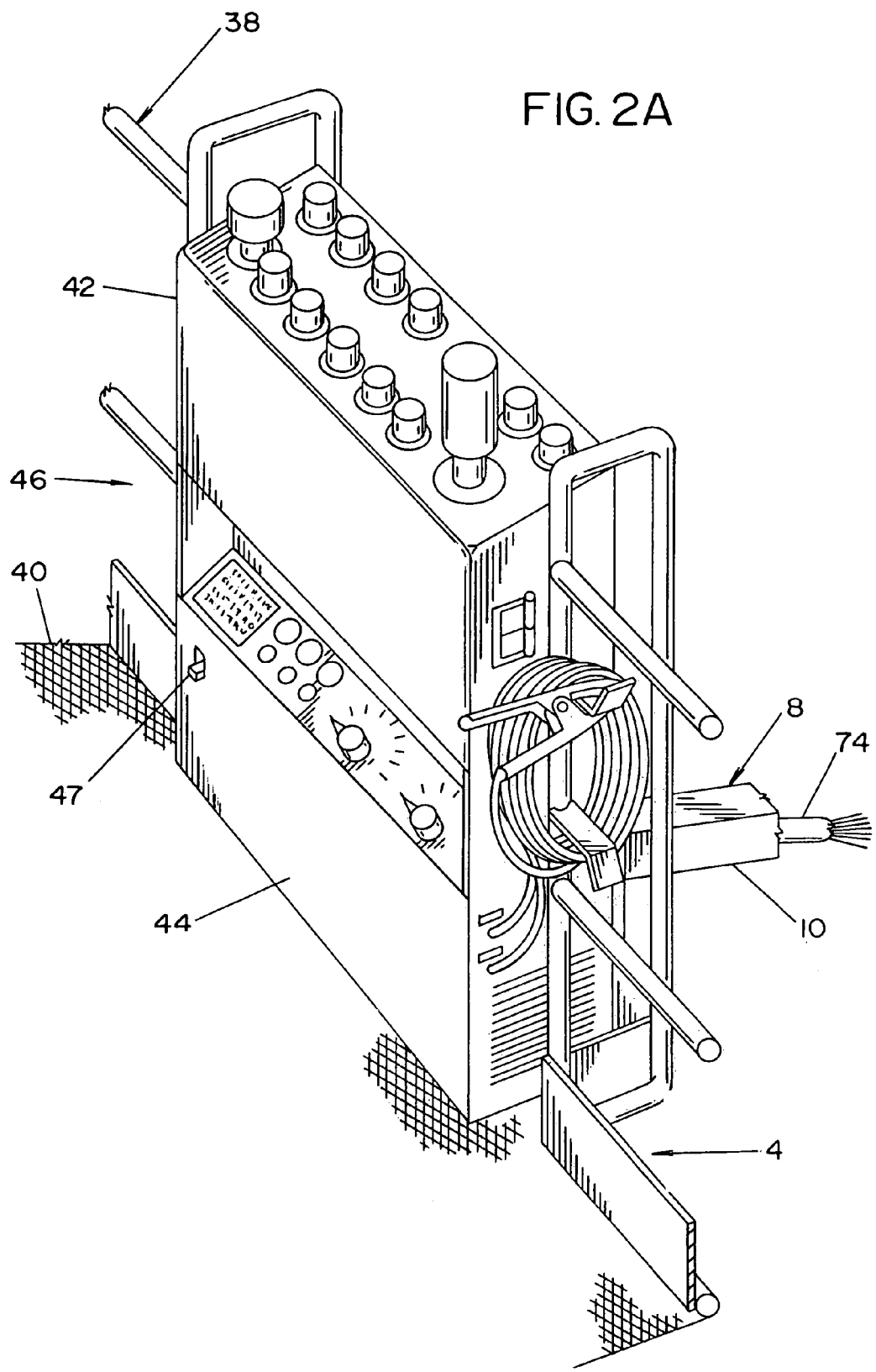
FIG. 2A is a perspective view similar to FIG. 2 showing the controls and welder as a single assembly.

The elements of the arc welder/lift system 2 described thus far are standard in the industry, and their assembly and operation are well known in the art. The present invention comprises an improvement to the articulating boom lift of the type shown in the drawings and for other lifts that include a boom that extends outward from a base. The improvement includes mounting an electric arc welder 44, such as a DC stick or MIG welder, in the cage 38 of the personnel platform 4 and electrically connecting it to the DC power supply 21 of the drive system 23. The electric arc welder 44 is part of a welding system that also includes a welding power supply 50, which is illustrated in more detail in FIG. 3. In the embodiment shown in FIGS. 1 and 2, the welder 44 is located below the controls 42. It is to be appreciated, however, that the controls 42 and the welder 44 may also be integrated into a single assembly 46, as shown in FIG. 2A, or the welder 44 may be mounted elsewhere on the personnel platform 4. The welder 44 typically includes a switch 47 for actuating the welder 44, as shown in FIG. 2A.

The operation of the welder/lift system 2 will be readily understood by those skilled in the art and others from the foregoing description. For example, the position of the personnel platform 4 may be raised or lowered by using a number of controls 42 mounted in the cage 38. Supplying hydraulic fluid to the cylinder of the middle lift hydraulic actuator assembly 32 on the side of the actuator piston that causes the shaft of the actuator to extend causes the raising linkage 16 to extend upward, whereby the personnel platform 4 is lifted. Supplying hydraulic fluid to the upper lift hydraulic actuator assembly 36 on the side of the actuator piston that causes the cylinder of the shaft of the actuator to extend also lifts the personnel platform 4. A further hydraulic actuator (not shown) controls the extension of the upper section 8 of the articulating boom 6. The supplying of hydraulic fluid to the opposite sides of the actuator piston while withdrawing hydraulic fluid from the pressurized side of the cylinders of the actuators causes the upper section 8 to shorten and the personnel platform 4 to lower, all in a conventional manner.

The control system for the welder/lift system 2 is preferably programmed such that the primary and secondary actuators are operated simultaneously to raise the personnel platform 4 to the desired height and adjust the amount the personnel platform extends outwardly away from the turntable 18. A skilled operator can manipulate the cage controls 42 to extend the personnel platform 4 to any desired location within range of the articulating boom 6. In addition, controls 42 in the cage 38 can be used to operate the drive system 23 to move the arc welder/lift system 2 to any desired location on the work site. Interlocks are usually provided to reduce drive speed when the personnel platform 4 is in the elevated position shown in FIG. 1. As will be readily understood by those skilled in this art, there are numerous articulating boom positions, such as the position shown in FIG. 1, where the personnel platform 4 is offset from the drive chassis 20 by an amount sufficient to apply a tilt force on the turntable 18 and the drive chassis 20.

Referring now to FIG. 3, the welding power supply 50 preferably comprises a common DC down chopper 52 for directing a current between an electrode E and a workpiece W. It is to be appreciated, however, that the power supply 50 may comprise other known welding circuits, such as a dual stage boost converter. The chopper 52 generally includes a DC input source 54, which is preferably the 48V power source 21 of the drive system 23, for providing a DC output across input leads 56, 58, which leads are illustrated as the input to the chopper 52. The chopper 52 includes a switching stage 60, which further includes a switching device 62 in the form of an IGBT or a FET, with an isolated optically coupled IGBT driver (not shown) switched according to the pulses on a feedback input driven by a standard optical coupler at a frequency of between 20-40 kHz. In practice, the pulses on the input to the driver are from the output 64 of the pulse width modulator (PWM) 66. The pulses of the pulse width modulated output cause the switching device 62 to be opened and closed at a rate of 20 kHz, with the duty cycle being controlled to determine the amount of current directed across electrode E and workpiece W.

A freewheeling diode 68 is connected in parallel with the welding operation and behind the parallel choke (or inductor) 70 of the switching stage 60. In accordance with standard technology, a waveform generator 72 drives the PWM 66 at a preferred frequency of 20 kHz. However, this frequency can be at various levels in the normal radio frequency range of 20-100 kHz.

The chopper 52 functions in accordance with standard chopper technology, with the duty cycle of the pulses on line 64 controlling the current applied to the arc between the electrode E and the workpiece W. Thus, in operation, the DC current is applied through the switching device 62 to the inductor 70. By turning the switching device 62 on and off, current in the inductor 70 and the arc between the electrode E and the workpiece W can be controlled. When the switching device 62 is closed, current is applied through the inductor 70 to the arc. When the switching device 62 opens, current stored in the inductor 70 sustains flow in the arc and through the diode 68. The repetition rate of switch closure is preferably 20 KHz, which allows for ultra-fast control of the arc. By varying the ratio of on-time versus off-time of the switching device 62 (i.e., the duty cycle), the current applied to the arc between the electrode E and the workpiece W is controlled.

Referring now to FIGS. 3 and 4, the input leads 56, 58 are preferably connected to the DC power source 21 by flexible 1" diameter No. 1/0 welding cabling 74 to reduce voltage losses. The flexible cabling 74 allows for movement along the articulating boom 6 during operation of the articulating boom 6. Alternatively, other size cabling may be used depending upon the requirements of the electric arc welder 44 and other considerations, as known to those skilled in the art.

FIG. 5 illustrates a basic wiring diagram for charging the arc welder/lift system 2 of the present invention. The arc welder 44 and the drive motor 19 are in electrical connection with and energized by a source of DC power supplied from the DC power source 21. The DC power source 21 may be supplied with recharging power by an on-board battery charger 76, which can be plugged into an external AC power source 78 by means of an extension cord (not shown). A switch 80 is used to actuate the motor 19 of the drive system 23.

The present invention has been described above in conjunction with an articulating boom lift. It is to be appreciated, however, that the present invention may incorporate other lifts known in the art instead of the articulating boom lift as described above. Thus, in accordance with an alternative embodiment of the present invention, FIG. 6 illustrates an arc welder/lift system 102 incorporating a scissor lift 104. As known to those skilled in the art, the scissor lift 104 typically includes a number of pivotal lift elements 106 that are each pivotally joined to subsequent lift elements 106, a personnel platform 108 and a standing base 110. Disposed between the platform 108 and the drive chassis member 111, while being attached to a number of lift elements 106, is a hydraulic ram 112. The hydraulic ram 112 raises the personnel platform 108 by moving the individually joined lift elements 106 to form a typical cross-type configuration. Conventionally, the drive chassis 111 of the scissor lift 104 includes a driving motor 113 that allows the scissor lift 104 to move from location to location. The driving motor 113 is powered by a DC power source 114, such as a 48 volt DC battery pack.

The elements of the scissor lift 104 described thus far and shown in FIG. 6 are generally standard in the industry, and their assembly and operation are well known in the art. This embodiment of the present invention comprises an improvement to the scissor lift of the type shown in FIG. 6. The improvement includes mounting an electric arc welder 116, as described earlier, on the platform 108. The arc welder 116 receives a DC input from the DC power system 114 and provides a current between an electrode and a workpiece in accordance with standard chopper technology, as described above in connection with FIG. 3.

The platform 108 is also provided with controls 118 for operating the arc welding/lift system 102. The welder 116 is illustrated as being located below the controls 118. It is to be understood, however, that alternatively the controls 118 and the welder 116 may be integrated to form a single unit.

The present invention has been described above in relation to DC-powered lifts. It is to be appreciated, however, that the present invention may also comprise an arc welder with a DC input mounted in a construction or industrial vehicle having a DC power source or DC bus, wherein the vehicle's DC power source or DC bus supplies power to the welder. Such industrial and construction vehicles are well known and may include, but are not limited to, skid steer loaders, forklifts, tow tractors, maintenance rigs, etc.

The invention has been described with reference to a preferred embodiment and alternates thereof. It is believed that many modifications and alterations to the embodiments disclosed readily suggest themselves to those skilled in the art upon reading and understanding the detailed description of the invention. It is intended to include all such modifications and alterations insofar as they come within the scope of the present invention.

The invention claimed is:

1. An electric arc welding apparatus comprising:
a welding station;
a battery for providing a DC battery voltage; and
a high switching speed converter coupled to said battery for converting said DC battery voltage to a signal conditioned for welding, wherein said high switching speed converter includes a pulse width modulator that at least partially controls said signal conditioned for welding to a welding electrode and a waveform generator that at least partially controls said pulse width modulator, said high switching speed converter creating a series of current pulses that constitute a welding cycle representative of a current waveform, said pulse width modulator controlling a current pulse width of a plurality of said current pulses, wherein said welding station, said battery and said high switching speed converter are movable on a wheeled carriage, and said battery comprises a 48 volt battery pack and provides DC voltage to said high switching speed converter and to said wheeled carriage.

2. The apparatus as defined in claim 1 wherein said waveform generator drives said pulse width modulator at a frequency of 20 kHz.

3. The apparatus as defined in claim 2 wherein said battery is supplied with recharging power by an on-board battery charger, said battery charger being operative to be plugged into an external AC power source via an extension cord.

4. The apparatus as defined in claim 3 wherein said high switching speed converter comprises a DC down chopper and wherein a freewheeling diode is connected in parallel with said welding electrode and behind a parallel choke of a switching stage of said high speed switching converter.

* * * * *